United States Patent [19]

Snead

[11] 3,722,660

[45] Mar. 27, 1973

[54] WEIGHING APPARATUS

[76] Inventor: Edwin Des Snead, P.O Box 798, Georgetown, Tex. 78626

[22] Filed: Nov. 26, 1971

[21] Appl. No.: 202,354

[52] U.S. Cl..................198/39, 177/16, 177/21 D
[51] Int. Cl..............................B65g 69/00
[58] Field of Search......177/210, DIG. 6, 16; 198/39; 214/2; 222/40, 52, 56, 23

[56] References Cited

UNITED STATES PATENTS

| | | | |
|---|---|---|---|
| 3,036,769 | 5/1962 | Goslin et al.....................198/39 X |
| 3,478,830 | 11/1969 | Lenesque et al..................177/210 X |
| 3,115,201 | 12/1963 | Brumbaugh.....................177/16 |

Primary Examiner—Richard E. Aegerter
Assistant Examiner—Douglas D. Watts
Attorney—Cecil L. Wood et al.

[57] ABSTRACT

An inclined conveyor belt for lifting bulk material is driven by a three phase electric motor. A watt-hour meter connected in the motor circuit measures the gross power required and compensates for the power required to drive the empty conveyor, with the meter having an output proportional to the net power used for the actual load. The meter drives a counter summing the weight of the load actually lifted.

10 Claims, 2 Drawing Figures

3,722,660

PATENTED MAR 27 1973

INVENTOR
Edwin deS. Snead

BY

ATTORNEYS

WEIGHING APPARATUS

BACKGROUND AND SUMMARY OF THE INVENTION

This invention relates to the weighing of bulk materials such as aggregate or ore; and more particularly to the weighing of such material on a continuous basis as it is lifted from one elevation to another on a powered continuous conveyor in connection with other processing of the material.

In many operations such as the processing of aggregate, ore, or coal for example, or the transfer or loading of such materials to storage areas or transport vehicles, it is necessary to measure the weight of the materials being processed, stored or transported. It is particularly desirable to be able to do this in conjunction with the otherwise normal handling of the material and in a manner which does not interfere with or delay the processing or handling of the material.

The vehicle for lifting the material according to the present invention may be a continuously driven belt conveyor, bucket elevator, apron conveyor, screw conveyor, or other device for lifting bulk materials, which is driven by an electric motor; and the vehicle for measuring the load is an electrical instrument coupled to the motor circuit to measure the conveyed load as a function of the power required to drive the conveyor unit motor. A difficulty with this arrangement is that the line voltage of the plant power lines which supply power to the driving motor is subject to considerable fluctuation in normal circumstances; and this may produce considerable error in such load measuring apparatus. In an industrial plant or in an aggregate plant, for example, the line voltage frequently changes by as much as ten or fifteen percent as large motors are started and stopped. Accordingly, in weighing apparatus of the type contemplated, means must be provided for eliminating or minimizing errors caused by such line voltage fluctuation.

A principal object of this invention is to provide improved apparatus for accurately weighing bulk material while lifting the material to a higher elevation. An ancillary object is to provide for such weighing by a mechanism which is not subject to error due to exposure to conditions of dust, grease and impact which necessarily exist at the site of the lifting apparatus.

Another object of this invention is to provide an improved lifting and weighing apparatus which measures the weight of the material lifted as a function of the electrical power consumed by the lift apparatus drive motor. An ancillary object is to provide such apparatus including means compensating for variations in line voltage, to obviate measurement errors due to such voltage variation. Another ancillary object is to provide such lifting and weighing apparatus providing variable field calibration for adjusting the apparatus at the plant site after installation.

A further object of this invention is to provide such measuring apparatus providing continuous numerical integration of the lifted load, and further to provide a continuous integration of "tons" lifted for example.

These objects are accomplished in apparatus comprising a lifting mechanism including an electrical driving motor. An electrical instrument of the watt-hour meter type has a rotor disc actuated electromagnetically by current windings and voltage windings. A load network for the meter includes coacting voltage and current windings for producing forward torque in the rotor disc, with the current windings being energized respectively by one or more current transformers coupled respectively to one or more of the power conductors to the driving motor, and with the voltage winding being connected across two power conductors to the driving motor. A compensation network includes coacting voltage and current windings for producing rearward torque in the rotor disc, with the voltage and current windings being connected to the secondary of a constant voltage transformer, the primary of which is connected across two of the motor power conductors. The compensation network current winding is further connected across the secondary of a variable autotransformer to vary the current in the current winding. A pulse generator associated with the rotor disc drives an electrically actuated counting means.

The novel features and the advantages of the invention, as well as additional objects thereof, will be understood more fully from the following description when read in connection with the accompanying drawing.

DRAWING

DESCRIPTION OF THE PREFERRED EMBODIMENT

Figure 1:
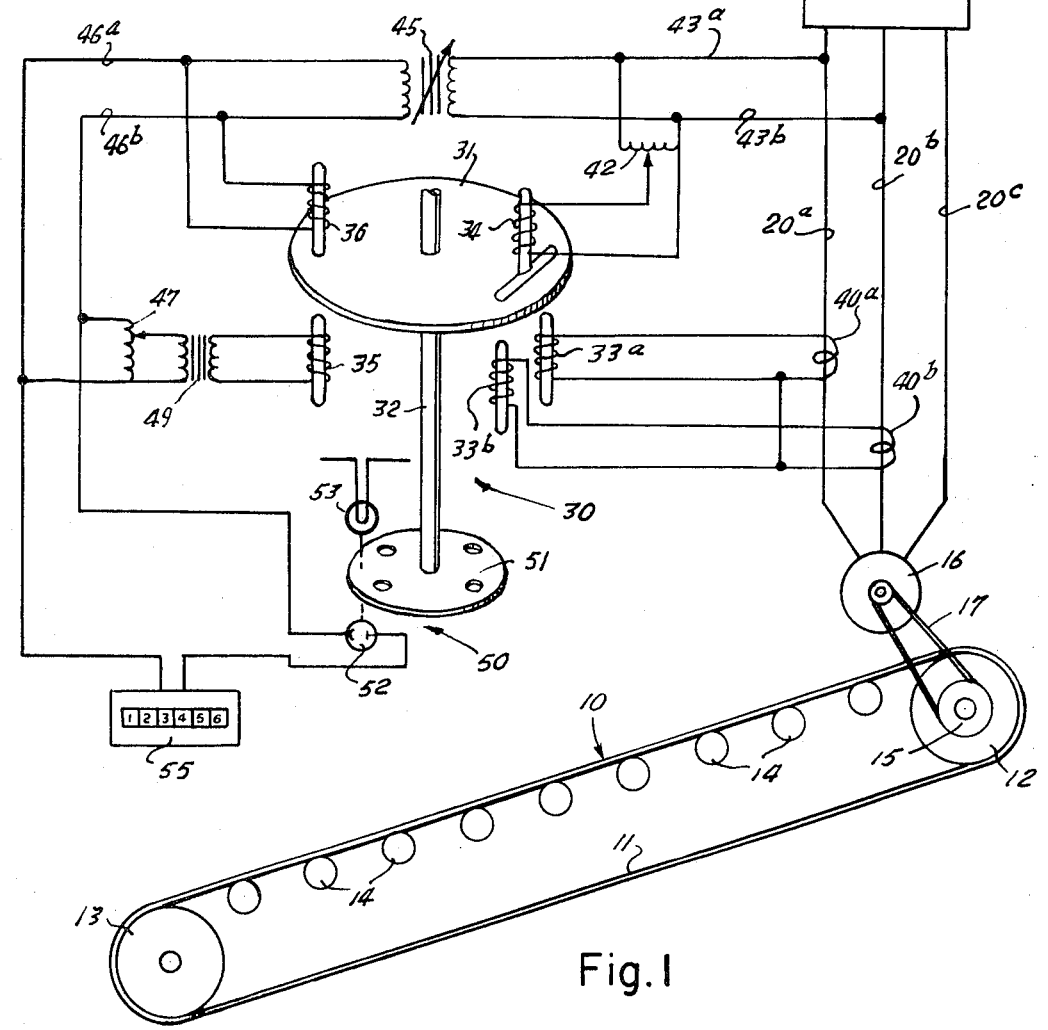
FIG. 1 is a schematic and diagrammatic illustration of a lifting and weighing apparatus according to the invention.

Referring to FIG. 1 the lifting apparatus consists of a conveyor belt unit 10 which may be a part of a more extensive conveying system, the belt unit including an endless belt 11 supported on a drive pulley 12 at the higher end of the unit, an idler pulley 13 at the lower end of the unit, and intermediate load supporting rollers 14. The unit drive pulley 12 may be driven through a suitable transmission or a gear reduction mechanism 15; and is driven by a three-phase electric motor 16 coupled to the transmission through a suitable V belt or chain drive 17, for example.

The conveyor belt unit 10 is merely illustrative of a continuous conveyor device for lifting bulk materials, and it will be apparent that other forms of conveyors may be used in the practice of the invention.

The power circuit for the motor 16 includes three motor power conductors 20a, 20b, and 20c connecting the motor to a magnetic starter 21, with the starter 21 being connected through suitable circuit breakers to the main power conductors 22a, 22b, and 22c for the plant at which the lifting and weighing apparatus is installed.

The electric power consumed by the motor 16 is detected and measured by an electrical instrument which, in the preferred form, is a watt-hour meter 30 having a rotor disc 31 nonrotatably mounted on an appropriate shaft 32 and electromagnetically driven through voltage and current windings coacting with the disc 31. Forward torque for driving the rotor disc in one direction is produced by coacting current windings 33a and 33b and voltage winding 34 which are a part of the load network for the meter. Rearward torque for driving the rotor disc in the opposite direction is produced by coacting current winding 35 and voltage winding 36 which are a part of the meter compensation network.

The two current windings 33a and 33b are energized respectively by current transformers 40a and 40b, which are coupled respectively to the motor conductors 20a and 20b. The current flowing through these windings then is proportional to the current supplied through two of the three power conductors 20 of the motor circuit. The voltage winding 34, which coacts with the current windings 33a and 33b is connected across the secondary of an adjustable autotransformer 42, the primary of which is connected across conductors 43a and 43b which are connected, respectively, to the motor conductors 20a and 20b. The current flowing through the voltage winding 34, then, is a function of the input voltage to the motor 16.

The current windings 33a and 33b and the voltage winding 34, then, produce a forward driving torque on the rotor disc 31 which is a function of, and proportional to, the energy supplied to the motor 16.

The conductors 43a and 43b are connected to the primary of a constant voltage transformer 45, and accordingly this transformer is connected across the motor conductors 20a and 20b. Conductors 46a and 46b are connected across the secondary of the constant voltage transformer 45 to provide a stabilized voltage source for the compensation network. The primary of an adjustable autotransformer 47 is connected across the conductors 46a and 46b and the secondary of the autotransformer 47 is coupled to the current winding 35 of the meter compensation network through an impedance matching transformer 49. The voltage winding 36 of the meter compensation network is connected across the conductors 46a and 46b.

The meter compensation network then is supplied with a stabilized voltage from the secondary of the constant voltage transformer 45, so that the currents energizing the respective voltage and current windings of this network are substantially independent of voltage fluctuations in the plant power conductors or the power conductors for the drive motor 16. This makes it possible to provide an accurate compensating backward torque as will now be described.

The compensation network is provided to produce a backward torque on the rotor disc which opposes and cancels out components of forward torque produced by the load network and which is proportional to the energy required to operate the conveyor without load. When the conveyor is operated without load, the current and voltage which energizes the load network windings 33a, 33b and 34, and the forward torque produced by these windings is proportional to the tare load. The rearward torque produced by the compensation network of voltage windings 36 and current winding 35 is adjusted through the autotransformer 47 to be just equal to the tare forward torque which is detected by the fact that the rotor disc does not rotate.

When the conveyor is then operated in loaded condition, the meter load network produces a forward torque proportional to the gross load on the conveyor which includes the tare load and the net load; but the net forward torque acting on the rotor disc is proportional to the net load being lifted by the conveyor unit 10.

Since the work done by the conveyor, and therefore the energy required to drive the conveyor, is a function of the height of lift by the conveyor unit 10, the measuring apparatus must be calibrated in accordance with the expected lift condition. It has been found to be impossible to accurately predict the exact ratio between tons carried and kilowatt hours used before installation at a plant site, accordingly a field calibration capability is required. Calibration is effected through the current transformers 40a and 40b and through the autotransformer 42. In the design and assembly of the measuring apparatus, rough calibration is effected by varying the ratio of turns in the current transformers 40a and 40b; and fine calibration is effected in the field after installations, through adjustment of the autotransformer 42 for the voltage winding 34.

The measuring apparatus includes a pulse generator 50 which, in the preferred form illustrated in FIG. 1, includes a disc 51 non-rotatably fixed to the rotor disc shaft 32 and coacting with a photo-electric cell 52 and associated light source 53. The disc 51 is provided with four holes equally spaced around the periphery, with the disc being disposed relative to the photocell and light source to successively interrupt and pass the light rays from the light source to successively energize the photocell 52.

The photocell 52 is connected in series with an electrically actuated counter 55, preferably a simple digital counter, with these series connected elements being connected and parallel across the conductors 46a and 46b. Assuming that this supply circuit for the counter is 110 volt circuit, the pulse generator produces 110 volt pulses to successively energize the counter. Preferably the measuring apparatus is designed and calibrated, relative to the speed of rotation of the rotor disc assembly and the number of holes in the generator disc 51, so that the counter circuit is energized once for each ton, for example, of material lifted on the apparatus. The above described pulse generator provides a frictionless drive mechanism for the counter 55.

Figure 2:
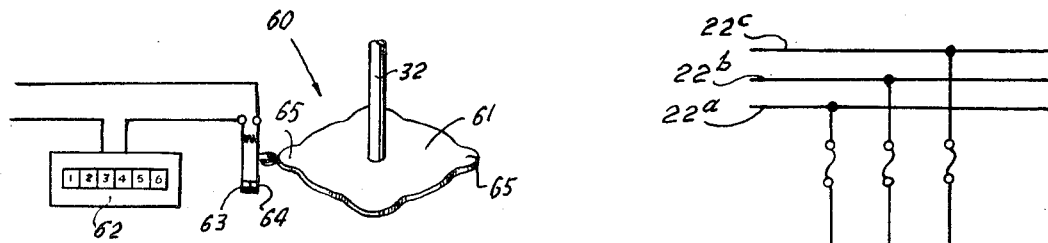
FIG. 2 is a fragmentary schematic and diagrammatic illustration of a modification of the apparatus of FIG. 1

FIG. 2 of the drawing illustrates, fragmentarily, an alternative form of pulse generator 60 which includes a cam disc 61 non-rotatably mounted on the shaft 32 of the meter rotor assembly. An electrically actuated counter 62 is connected in series with switch contacts 63 and 64 which are normally urged to an open condition, with these series connected components being connected to a suitable energizing source such as the circuit 46a, 46b. The movable contact 64 is successively engaged by peripherally spaced cams 65 of the cam disc 61 to successively close the counter circuit and energize the counter in relation to the disc rotation. FIG. 2, then, discloses an alternative form of pulse generator and counter energizing circuit for translating the rotor drive of the meter into a ton count, or a count of other weight units.

OPERATION

In the assembly of apparatus according to the invention, the apparatus is initially calibrated for the height of lift and length of load travel for the conveyor unit 10 by preselecting or varying the turns ratio of the current transformers 40a and 40b. Furthermore in the design and assembly of the apparatus, the several components particularly the transformer components are selected in relation to the conveyor height and length and the expected average load on the conveyor so that the output of the apparatus counter 55 will accumulate the load directly in tons, for example, or in some other convenient unit of weight depending on the particular installation.

After installation of the apparatus at the plant site, the conveyor is operated in unloaded condition to adjust the meter to compensate for the tare load or the power required to operate the conveyor unit without load. When operated in this manner a forward torque on the rotor disc 31 is produced by the current windings 33a and 33b and the voltage winding 34, this forward torque being proportional to the tare load.

Reverse torque on the rotor disc 31 is provided through the current winding 35 and the voltage winding 36; and this reverse torque is adjusted by means of the variable autotransformer 47 to exactly balance the forward torque produced under no load conditions. This balancing is observed by the fact that the rotor disc does not rotate; and the balancing reverse torque is stabilized through the variable voltage transformer 45.

Calibration of the system is then effected by operating the conveyor unit 10 under loaded conditions and taking other measurement of the load by auxiliary means, and then comparing this other measurement with the load indicated by the ton counter 55. If the meter does not accurately record the delivered load the load voltage impressed on the voltage winding 34 may be adjusted through the autotransformer 42 to adjust the forward driving torque. It may then be necessary to readjust the rearward torque through the autotransformer 47 under no load conditions and again operate the apparatus under load conditions for a calibration check.

When finally calibrated, the apparatus will always measure the net delivered load directly in tons, or other preselected units of weight measure.

What has been described is an improved apparatus for lifting and accurately weighing bulk materials and producing a cumulative count of the weight of material delivered over any given period of time, by converting kilowatt hours into tons delivered.

A particular feature and advantage of the apparatus is the provision of a constant voltage transformer in the compensation network for providing a stabilized voltage and accordingly provide a stabilized backward torque in order to accurately cancel out the energy required to drive the conveyor unit 10 unloaded or, in other words, to neutralize the tare load of the conveyor unit.

Another important feature and advantage of the apparatus is the provision of a pulse generator driven by the meter for driving or energizing an electrically actuated counter, which pulse generator is frictionless or substantially frictionless to eliminate or minimize any error due to friction drive of an integrating mechanism.

Still another important feature and advantage of the invention is the provision for infinitely variable field calibration of the apparatus. It has been found to be impossible to predict the exact ratio between the loaded tons carried and the kilowat hours used in advance of placing the apparatus at the plant site. To obviate this problem, rough calibration of the apparatus is made at the time of assembly and final field calibration is made through the variable autotransformer 42 to adjust the component of load voltage impressed on the voltage winding 34.

An overall advantage of the apparatus described is that the apparatus is very accurate, with an error of less than 2 percent due in part to the above mentioned features, and due in part to the fact that the weight load is automatically averaged by the total weight carried on the conveyor unit over its length rather than its instantaneous weight of a load at a particular discreet anchorment of the belt length. An ancillary advantage is the lack of necessity of an expensive integrating mechanism for achieving this accuracy.

While the preferred embodiment of the invention has been illustrated and described, it will be understood by those skilled in the art that changes and modifications may be resorted to without departing from the spirit and scope of the invention.

What is claimed is:

1. Apparatus for elevating and weighing a load comprising
   a lifting mechanism including an electric driving motor;
   an electrical instrument of the watt-hour meter type having a rotor disc actuated electromagnetically by current and voltage windings;
   a load network for said instrument including current and voltage windings energized by the motor power conductors coacting with said rotor disc to produce forward driving torque proportional to the energy supplied to the motor; said voltage winding being connected across the power conductor to said motor; said current windings being energized by respective current transformers coupled to respective power conductors to said motors;
   a compensation network for said instrument including current and voltage windings coacting with said rotor disc to produce rearward driving torque, said windings being connected to the secondary of a constant voltage transformer; said current winding being connected across the secondary of an adjustable transformer, the primary of said transformer being connected across said constant voltage transformer;
   an electrically actuated counter for summing accumulated units of weight; and an electric pulse generator driven by said rotor disc for actuating said counter.

2. Apparatus as set forth in claim 1 wherein the primary of said constant voltage transformer is connected across the power conductors to said motor.

3. Apparatus as set forth in claim 1 said adjustable transformer for said compensation network current winding being an autotransformer.

4. Apparatus as set forth in claim 3 including an impedance matching transformer for coupling said autotransformer and said current winding.

5. Apparatus as set forth in claim 1 wherein said pulse generator including a photoelectric cell connected in the circuit for said electrical counter, a light source for energizing said photoelectric cell; and a member driven by said rotor disc for alternately interrupting and passing light rays from said light source to said photoelectric cell to generate electrical pulses for actuating said counter.

6. Apparatus as set forth in claim 1
said pulse generator including a rotary cam member driven by said rotor disc, said cam member having peripherally spaced cams;
switch means connected in series with said electric counter; and said switch means being positioned to be actuated intermittently by said spaced cams to generate electrical pulses for actuating said counter.

7. Apparatus as set forth in claim 1
said counter being connected across the secondary of said constant voltage transformer.

8. Apparatus as set forth in claim 1
including means for adjusting the voltage impressed on said load network voltage winding, to adjust the forward torque produced in relation to the energy supplied to the motor.

9. Apparatus as set forth in claim 8
said voltage adjusting means comprising an autotransformer, with said voltage winding being connected across the secondary of said autotransformer.

10. Apparatus as set forth in claim 1
said lifting mechanism comprising a belt conveyor unit.

* * * * *